US012450272B1

(12) United States Patent
Xu et al.

(10) Patent No.: US 12,450,272 B1
(45) Date of Patent: Oct. 21, 2025

(54) TEXT-TO-SQL MODEL ANCHOR QUERY GENERATION

(71) Applicant: Coinbase, Inc., Oakland, CA (US)

(72) Inventors: Yifan Xu, Redmond, WA (US); FNU Kishan Borule Rahul, Bangalore (IN); Varsha Mahadevan, Bangalore (IN)

( * ) Notice: Subject to any disclaimer, the term of this patent is extended or adjusted under 35 U.S.C. 154(b) by 0 days.

(21) Appl. No.: 18/670,720

(22) Filed: May 21, 2024

(51) Int. Cl.
  *G06F 16/00* (2019.01)
  *G06F 16/3332* (2025.01)
  *G06F 16/334* (2025.01)

(52) U.S. Cl.
  CPC ...... *G06F 16/3344* (2019.01); *G06F 16/3332* (2019.01)

(58) Field of Classification Search
  CPC .......................... G06F 16/3344; G06F 16/3332
  See application file for complete search history.

(56) References Cited

U.S. PATENT DOCUMENTS

| 2011/0320187 | A1* | 12/2011 | Motik | G06F 16/3344 704/9 |
| 2020/0034362 | A1* | 1/2020 | Galitsky | G06F 40/247 |
| 2023/0061906 | A1* | 3/2023 | Gaur | G06F 16/243 |

FOREIGN PATENT DOCUMENTS

| CN | 114238373 A | * | 3/2022 |
| CN | 116821168 A | * | 9/2023 |

* cited by examiner

Primary Examiner — Dinku W Gebresenbet
(74) Attorney, Agent, or Firm — Holland & Hart LLP

(57) ABSTRACT

Methods, systems, and devices for data management are described. The method may include generating, for a database table and using a language model, candidate structured query language (SQL) queries and candidate query intents using a set of SQL query templates and table metadata for the database table, where each candidate SQL query is associated with a respective candidate query intent. The method may include validating the respective candidate query intents by translating the candidate query intent into a test SQL query and determining whether the test SQL query corresponds to a candidate SQL query associated with the candidate query intent. The method may include augmenting each query intent with contextual cues resulting in anchor query candidates for each query intent and generating anchor queries for the database table based on whether the anchor query candidates for each query intent results in identification of the database table by the language model.

20 Claims, 10 Drawing Sheets

TEXT-TO-SQL MODEL ANCHOR QUERY GENERATION

FIELD OF TECHNOLOGY

The present disclosure relates generally to data management, including techniques for text-to-structured query language (SQL) model anchor query generation.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
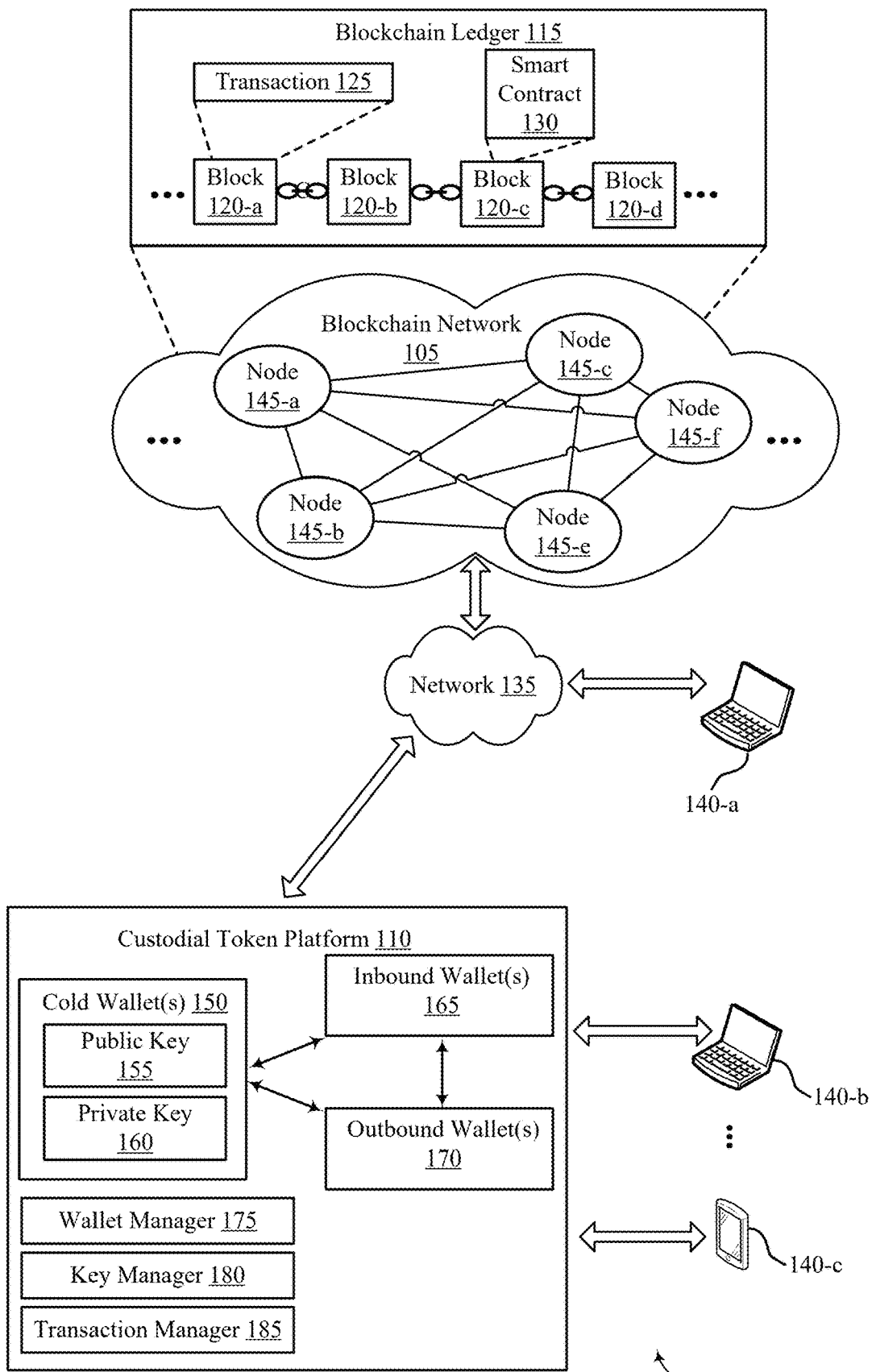
FIG. 1 illustrates an example of a computing environment that supports text-to-structured query language (SQL) model anchor query generation in accordance with aspects of the present disclosure.

Some computing systems may support database management including semantic search techniques and structured query language (SQL) construction. For example, some computing systems may support a text-to-SQL translation in which a natural language query is converted into a SQL code or SQL command (e.g., SQL query). Prior to SQL construction, the text-to-SQL translation may include a semantic search (e.g., query-to-table) via which the natural language query is matched to one or more database tables based on table metadata. By matching the natural language query to the one or more database tables prior to SQL construction, a level of efficiency associated with the text-to-SQL translation may be improved. However, a database may include multiple database tables with corresponding descriptions, which, in some cases, may include overlapping or similar content. For example, a service supporting the text-to-SQL translation may, using a language model, map the natural language query to the one or more database tables by generating vector embeddings and comparing an vector embedding of the natural language query to respective vector embeddings of metadata (e.g., table descriptions) of each database table of the multiple database tables. Because some of the database tables may have the overlapping or similar content, the vector embeddings may be similar, and the service may inaccurately match the natural language query to the one or more database tables. Accordingly, improved semantic search techniques may be used to improve a level of accuracy with respect to matching one or more database tables to a natural language query and maintain improved efficiency for the text-to-SQL translation associated with semantic search for table selection.

As described herein, the service may perform the semantic search according to multiple anchor queries. For example, rather than mapping the natural language query to the tables (e.g., directly), the service may compare vector embeddings of the natural language query to vector embeddings of the multiple anchor queries, where each database table is associated with one or more of the multiple anchor queries. The anchor queries may serve as reference points or "anchors" in the semantic search and may be more representative of metadata associated with the corresponding database table. In other words, the anchor queries may be representative of the nuanced differences between different database tables, which may otherwise have similar vector embeddings. By comparing the natural language query to multiple anchor queries, the service may improve a level of accuracy associated with the semantic search and improve efficiency for the text-to-SQL translation.

To generate the anchor queries, the service may perform an automated anchor query generation process. The anchor query generation process may involve initial generation, back-translation, contrastive learning, and validation. For example, the service may generate, for a database table and using a language model, candidate SQL queries and candidate query "intents" using a set of SQL query templates and table metadata for the database table, where each candidate SQL query may be paired with a respective candidate query intent. The candidate query intents may be representative of a specific question or the task indicated by a natural language query. For example, a query intent may define information or action sought by a user providing the natural language query. The service may validate the respective candidate query intents by translating (e.g., back-translating) the candidate query intent into a test SQL query and determining whether the test SQL query corresponds to a candidate SQL query associated with the candidate query intent. After translating the candidate query intents, the service may augment each query intent with "contextual cues" resulting in anchor query candidates for each query intent. For example, the service may add contextual cues which indicate a category or type of data sought by a natural language query, where the query intent and corresponding contextual cue are representative of the natural language query. The service may generate anchor queries for the database table based on whether the anchor query candidates for each query intent result in identification of the database table by the language model. That is, the service may implement the anchor queries in the semantic search after testing whether the anchor query candidates map to a correct database table.

FIG. 1 illustrates an example of a computing environment 100 that supports text-to-SQL model anchor query generation in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

The custodial token platform 110 may support text-to-SQL translation in which natural language queries are translated to SQL queries based on generated anchor queries. For example, a service of the custodial token platform 110 may support the text-to-SQL translation by comparing a natural language query provided by the computing device 140 to the generated anchor queries to select one or more database tables of multiple database tables of a database. To generate the anchor queries, the service may generate, for a database table and using a language model, candidate SQL queries and candidate query intents (e.g., in pairs) using a set of SQL query templates and table metadata for the database table. The service may validate the respective candidate query intents by translating (e.g., back-translating) the candidate query intent into a test SQL query and determining whether the test SQL query corresponds to a candidate SQL query associated with the candidate query intent. The service may augment each query intent with contextual cues resulting in anchor query candidates for each query intent and generate the anchor queries for the database table based on whether the anchor query candidates for each query intent results in identification of the database table by the language model.

After generating the anchor queries, the service may receive user inputs indicating natural language queries and use the anchor queries to select database tables, based on which the service may construct an SQL query corresponding to the natural language query. Anchor query generation is described with respect to the custodial token platform 110, but it should be understood that the anchor query generation and text-to-SQL techniques are applicable in environments separate from the custodial token platform 110, as described in further detail herein.

Figure 2:
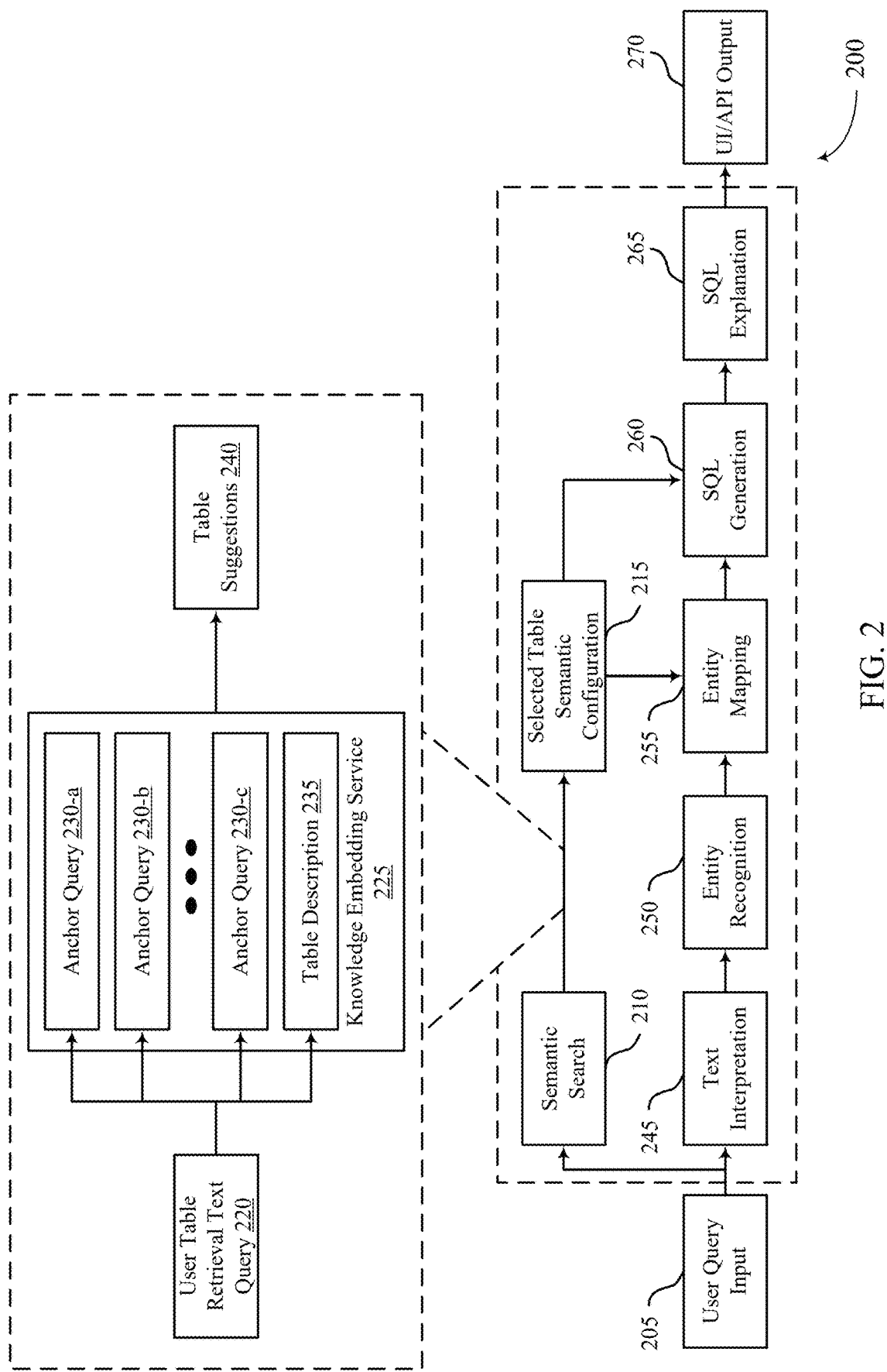
FIGS. 2 and 3A show examples of text-to-SQL flow diagrams that support text-to-SQL model anchor query generation in accordance with aspects of the present disclosure.

FIG. 2 shows an example of a text-to-SQL flow diagram 200 that supports text-to-SQL model anchor query generation in accordance with aspects of the present disclosure. The text-to-SQL flow diagram 200 may implement or be implemented by one or more devices or systems as described with reference to FIG. 1. For example, the text-to-SQL flow diagram 200 may be implemented by a service of a custodial token platform, such as the custodial token platform 110 as described with reference to FIG. 1. The text-to-SQL flow may be implemented in environments other than the custodial token platform 110. For example, the text-to-SQL flow may be implemented in other environments that receive text queries and convert the text queries to SQL queries for retrieving data from one or more databases.

A service may support text-to-SQL translation according to the text-to-SQL flow diagram 200 described herein. One or more of the operations of the text-to-SQL flow diagram 200 may be representative of a series of application programming interface (API) calls. For example, at 205, the service may receive a user query input. The service may receive the user query input via a user interface of the service on a computing device, such as the computing device 140 as described with reference to FIG. 1. The user query input may have a natural language format (e.g., "how many unique tokens are inside the Ethereum blockchain?"). In some examples, a frontend of the service (e.g., the user interface) may send the user query to a backend of the service for processing. Sending the user query to the backend may involve calling an API of the service.

At 210, the service may perform a semantic search. For example, the service may perform the semantic search to select one or more tables for the text-to-SQL translation. In other words, in response to performing the semantic search, at 215, the service may output a selected table semantic configuration to be used in the entity mapping at 255, the SQL generation at 260, or both. Selection of the one or more tables prior to SQL generation may improve a level of efficiency associated with the text-to-SQL translation compared to SQL generation based on all tables of a database. In some examples, to select the one or more tables, the service may perform the semantic search based on anchor queries. The generation of anchor queries may be described in greater detail elsewhere herein, including with reference to FIG. 3. The service may generate the anchor queries via a language model and, in some examples, based on manual input.

The service may provide a user table retrieval text query 220 to a knowledge embedding service 225. For example, the service may call an API of the knowledge embedding service 225, where the call includes information associated with the user query input received by the service at 205. The knowledge embedding service 225 may generate a vector embedding of the user table retrieval text query 220. The knowledge embedding service 225 may compare the generated vector embedding of the user table retrieval text query 220 to respective vector embeddings of anchor queries. For example, the knowledge embedding service 225 may compare the user table retrieval text query 220 to an anchor query 230-a, an anchor query 230-b, and an anchor query 230-c to determine which anchor query has a highest degree of similarity (e.g., according to comparing the vector embeddings) to the user table retrieval text query 220. The anchor queries may correspond to respective tables of multiple tables of a database. For example, the knowledge embedding service 225 may include respective sets of anchor queries corresponding to each table of the database. Additionally, or alternatively, the knowledge embedding service 225 may compare the generated vector embedding of the user table retrieval text query 220 to a vector embedding of a table description 235, or respective table descriptions of tables of the database.

Based on comparing the user table retrieval text query 220 to the anchor queries and/or the table description 235, the knowledge embedding service 225 may output table suggestions 240. The table suggestions may include one or more tables of the database associated with the anchor queries having the highest degree of similarity to the user table retrieval text query 220 according to comparison of the vector embeddings. The service may obtain the table suggestions 240 from the knowledge embedding service 225 and, at 215, input the selected semantic table configuration to the entity mapping at 255, the SQL generation at 260, or both.

After performing the semantic search, the service may perform the text-to-SQL translation based on the selected tables. At 245, the service may perform text interpretation. For example, the service may interpret the user query input received at 205 via a language model (e.g., a large language model (LLM)). The interpretation may involve identifying key phrases, actions, and entities involved in the request. As an example, for a user query input of "count the number of unique tokens are inside the Ethereum blockchain?," the language model may identify "count" and "unique tokens," as key phrases.

At 250, the service may perform entity recognition. For example, the service may, via the language model, extract and recognize entities from the interpreted query. The service may identify and categorize potential database entities, such as table names, column names, values, or operations based on the interpreted query. In the example of the user query input "count the number of unique tokens are inside the Ethereum blockchain?," the language model may output "Measure": [["COUNT(DISTINCT(tokens))" ]].

At 255, the service may perform entity mapping. For example, the service may map the identified entities from 250 to database schema via the language model. In some examples, the service may repeat the entity recognition (e.g., or otherwise determine entities from the interpreted query) based on a mismatch between the recognized entities from 250 and the database schema. Additionally, or alternatively, the service may perform the entity mapping based on the selected table semantic configuration. For example, the service may map entities identified from the interpreted query to entities of the selected one or more tables.

At 260, the service may generate an SQL query. For example, the service may formulate the SQL query based on the mapped entities and user intent. The service, via the language model, may construct an SQL query that fulfills a retrieval or manipulation request indicated by the user query input while adhering to syntax and structural accuracy of SQL. In addition to generating the SQL query at 260, the service may generate a corresponding SQL explanation 265. The SQL explanation may be of a natural language format and may explain actions performed on the database according to the generated SQL query. In some examples, a user may validate whether the generated SQL corresponds to an intent of the user based on the SQL explanation.

At 270, the service may output a UI/API output. In other words, the service may return a result of the generated SQL query. For example, the service may display the generated SQL query and/or the SQL explanation via the user interface of the service at the computing device. In some examples, the service may display the generated SQL query and/or the SQL explanation based on calling an API of an application including the service.

Figure 3A:
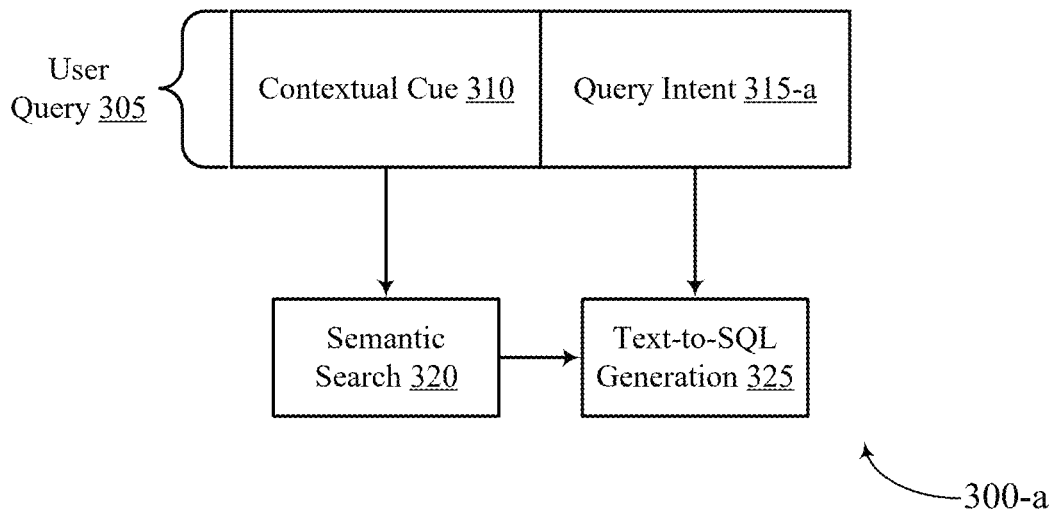

FIG. 3A shows an example of a text-to-SQL flow diagram 300-*a* that supports text-to-SQL model anchor query generation in accordance with aspects of the present disclosure. The text-to-SQL flow diagram 300-*a* may implement or be implemented by the computing environment 100, the text-to-SQL flow diagram 200, or both. For example, the text-to-SQL flow diagram 300-*a* may include a user query 305, which may be an example of the user query input as described with reference to FIG. 2.

The user query 305 may include a contextual cue 310 and a query intent 315-*a*. The contextual cue 310 may indicate a category or type of data being sought by the user query 305. A service supporting text-to-SQL translation may select a table based on the contextual cue 310. As an example, the contextual cue 310 may be: "given the table that tracks and monitors the risk associated with token creators and liquidity pool creators."

The query intent 315-*a* may indicate a question or task to be executed by the query. The query intent 315-*a* may correspond to a table identified (e.g., implicitly) by the contextual cue 310 and may define information or action sought by the user query 305. As an example, the query intent 315-*a* may be: "what are the unique names of the insiders who are categorized as 'medium risk' in the table, excluding null values."

The service may provide the contextual cue 310 as an input to a semantic search 320 to identify one or more tables associated with the user query 305 prior to generating the SQL query. For example, the service, via a language model, may compare the contextual cue 310 to multiple anchor queries of a database, where each of the anchor queries is associated with a respective table of the database. In some examples, more than one anchor query may be associated with the respective table. After identifying the one or more tables, the service may perform text-to-SQL generation 325 using the identified one or more tables and based on the query intent 315-*a*. For example, the service may generate an SQL query corresponding to the user query 305.

Figure 3B:
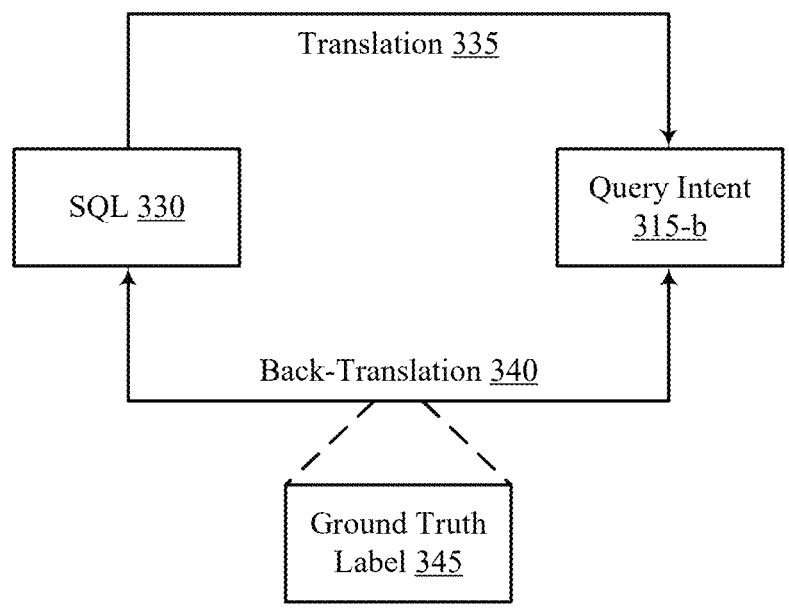
FIG. 3B shows an example of anchor query translation that supports text-to-SQL model anchor query generation in accordance with aspects of the present disclosure.

FIG. 3B shows an example of anchor query translation 300-*b* that supports text-to-SQL model anchor query generation in accordance with aspects of the present disclosure. The anchor query translation 300-*b* may implement or be implemented by the computing environment 100, the text-to-SQL flow diagram 200, the text-to-SQL flow diagram 300-*a*, or any combination thereof. For example, the anchor query translation 300-*b* may include a query intent 315-*b*, which may be an example of the query intent 315-*a* as described with reference to FIG. 3A.

To generate anchor queries, the service may generate multiple query intent-SQL query pairs. For example, the service may initially generate SQL queries and query intents, which may be referred to as "candidate" queries, such as queries that are not yet validated. The service may generate the candidate SQL queries and candidate query intents (e.g., natural language queries) based on table metadata of a table of multiple tables of a database. Additionally, or alternatively, the service may generate the candidate SQL queries and candidate query intents based on a set of query templates. For example, the query template may define a query format including one or more placeholders for one or more database elements, such as of a table name, a column name, a condition, and a function (e.g., aggregate function, string function, etc.). Each of the candidate SQL queries may correspond to (e.g., be associated with) a respective candidate query intent of the candidate query intents.

The service may validate the generated candidate SQL queries and candidate query intents by translating candidate SQL queries to query intents and by translating candidate query intents to SQL queries. The SQLs and query intents generated via translation may be referred to as "test" queries, such as queries which are in the process of being validated. The service may perform a translation 335 (e.g., machine translation) of the SQL 330, which may be a candidate SQL, into the query intent 315-*b*, which may be a test query intent. In other words, the service may generate a test query intent based on a candidate SQL query. Additionally, or alternatively, the service may perform a back-translation 340 (e.g., machine translation) of the query intent 315-*b*, which may be a candidate query intent, to the SQL 330, which may be a test SQL. That is, the service may generate a test SQL query based on a candidate query intent.

The service may perform the translation 335, the back-translation 340, or both according to a ground truth label 345. The ground truth label 345 may include the SQL templates and the table metadata. In other words, the service may generate the test SQL queries, the test query intents, or both according to the SQL templates and table metadata. After performing the translation 335 and the back-translation 340, the service may verify that the SQL queries and query intents are accurately paired.

Figure 4:
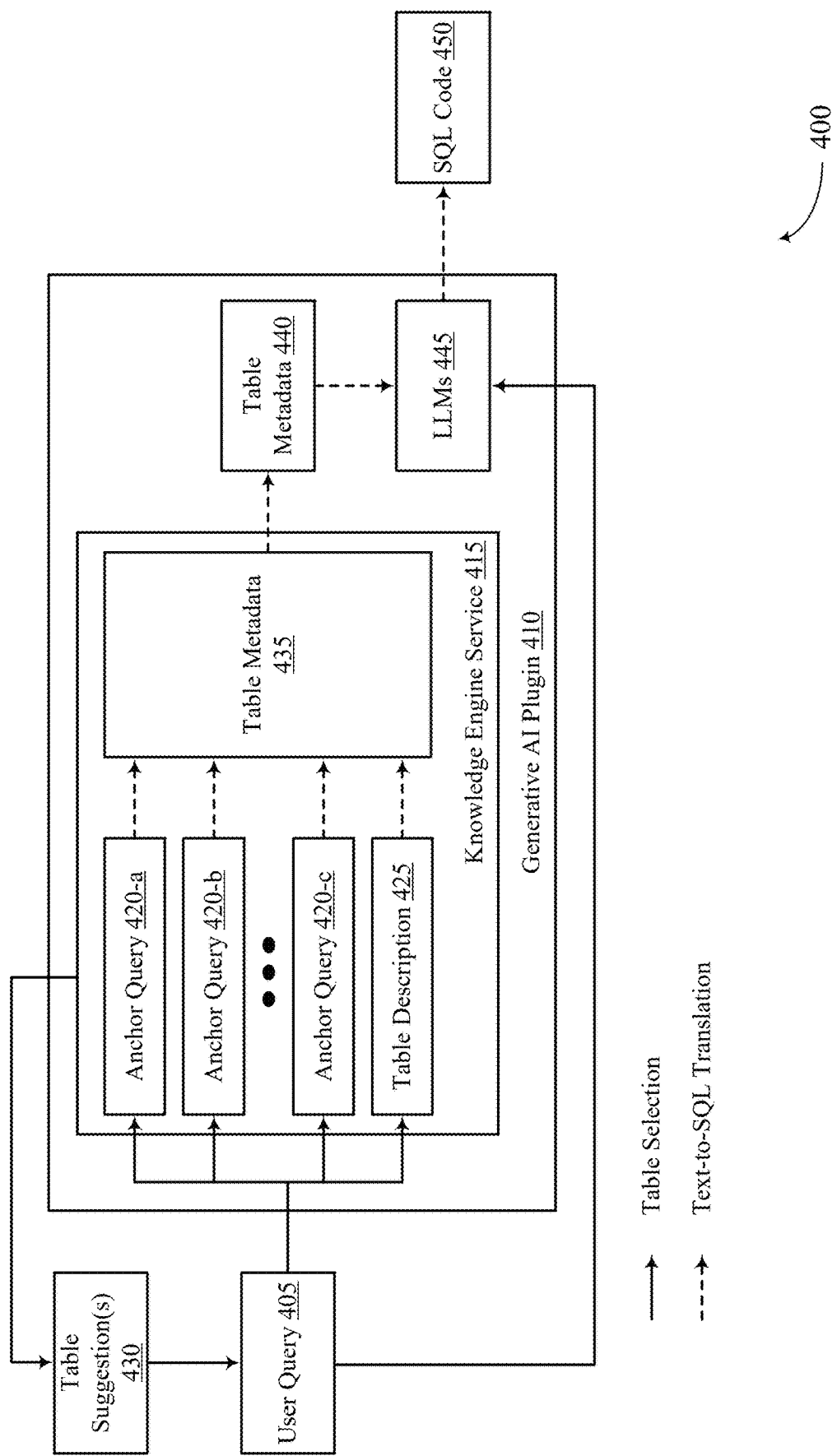
FIG. 4 shows an example of a text-to-SQL flow diagram that supports text-to-SQL model anchor query generation in accordance with aspects of the present disclosure.

FIG. 4 shows an example of a text-to-SQL flow diagram 400 that supports text-to-SQL model anchor query generation in accordance with aspects of the present disclosure. The text-to-SQL flow diagram 400 may implement or be implemented by the computing environment 100, the text-to-SQL flow diagram 200, the text-to-SQL flow diagram 300-*a*, the anchor query translation 300-*b*, or any combination thereof. For example, the text-to-SQL flow diagram 400 may be implemented by a service of a custodial token platform, such as the custodial token platform 110 as described with reference to FIG. 1.

A service may support text-to-SQL translation according to the text-to-SQL flow diagram 400 described herein. One or more of the operations of the text-to-SQL flow diagram 400 may be representative of a series of API calls. The service may include a generative AI plugin 410 including a knowledge engine service 415, which may map a user query 405 to multiple anchor queries to produce table suggestions 430, SQL code 450, or both.

Before generating the SQL code 450 (e.g., performing text-to-SQL translation), the service may perform a semantic search. For example, the service may input the user query 405 to the knowledge engine service 415 of the generative AI plugin 410. In some examples, the user query 405 input to the knowledge engine service 415 may be a natural language query. The knowledge engine service 415 may generate a vector embedding of the user query 405 based on receiving the input. Alternatively, the user query 405 input to the knowledge engine service 415 may be the vector embedding. That is, the service may generate the vector embedding of the user query 405 prior to providing the user query 405 to the knowledge engine service 415.

The knowledge engine service 415 may compare the vector embedding of the user query 405 to respective vector embeddings of anchor queries of different tables of a database. For example, the knowledge engine service 415 may compare the vector embedding of the user query 405 to vector embeddings of an anchor query 420-*a*, an anchor query 420-*b*, an anchor query 420-*c*, and so on. Additionally, or alternatively, the knowledge engine service 415 may compare the vector embedding of the user query 405 to a vector embedding of table descriptions, such as a table description 425. The knowledge engine service 415, based on comparing the respective vector embeddings, may determine that the user query 405 corresponds to one or more tables. That is, the knowledge engine service 415 may select one or more tables based on which the SQL code 450 may be generated.

The knowledge engine service 415 may output table suggestions 430 indicating the one or more selected tables. The service may provide the user query 405 and the table suggestions 430 to the knowledge engine service 415 of the generative AI plugin 410. For example, the service may input the user query 405 and the table suggestions 430 to the knowledge engine service 415 to translate the user query 405 to the SQL code 450 based on the table suggestions 430. The knowledge engine service 415 may retrieve table metadata 440 from table metadata 435 of multiple tables associated with the database. For example, the table metadata 440 may be metadata associated with the table suggestions 430. After the knowledge engine service 415 retrieves the table metadata 440, the generative AI plugin 410 may input the user query 405 and the table metadata 440 to LLMs 445. For example, the service may generate the SQL code 450 via the LLMs 445 based on the table metadata 440 and the user query 405.

Figure 5:
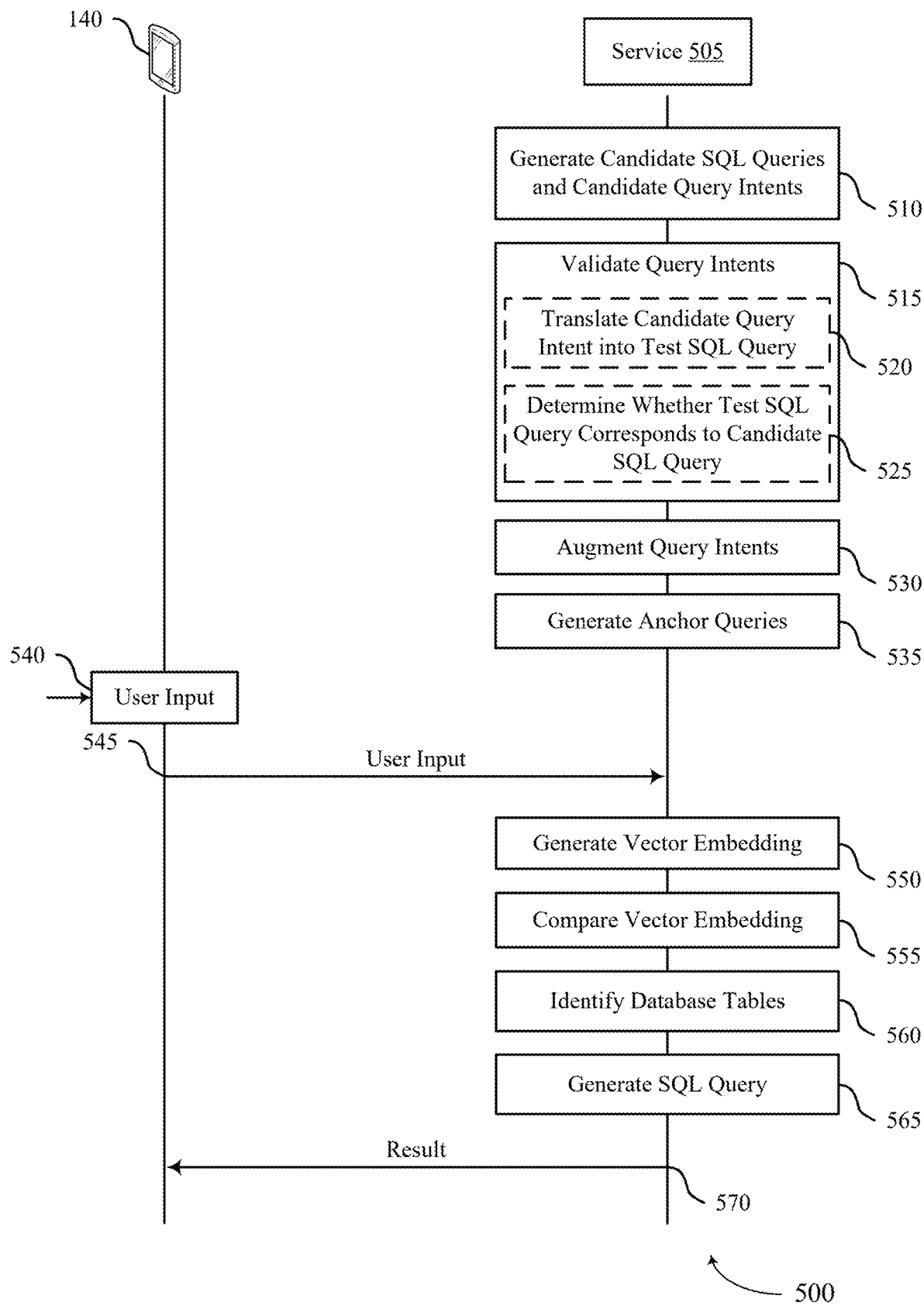
FIG. 5 shows an example of a process flow that supports text-to-SQL model anchor query generation in accordance with aspects of the present disclosure.

FIG. 5 shows an example of a process flow 500 that supports text-to-SQL model anchor query generation in accordance with aspects of the present disclosure. In some examples, the process flow 500 may implement or be implemented computing environment 100, the text-to-SQL flow diagram 200, the text-to-SQL flow diagram 300-*a*, the anchor query translation 300-*b*, the text-to-SQL flow diagram 400, or any combination thereof. For example, the process flow 500 may include a computing device 140 and a service 505, which may be examples of the corresponding devices as described with reference to FIGS. 2-4. The service 505 may be supported by one or more servers, which may also support or be configured to access one or databases, as described herein.

Alternative examples of the following may be implemented, where some operations are performed in a different order than described or are not performed at all. In some cases, operations may include additional features not mentioned below, or further operations may be added. Although the computing device and the service 505 are shown performing the operations of the process flow 500, some aspects of some operations may also be performed by one or more other components.

At 510, the service 505 may generate candidate SQL queries and candidate query intents. For example, the service 505 may generate multiple candidate SQL queries and multiple SQL query intents for a database table and using a language model. The service 505 may generate the multiple candidate SQL queries and multiple SQL query intents using a set of SQL query templates and table metadata for the database table (e.g., table descriptions, column names and/or descriptions, column identifiers). Each candidate SQL query of the multiple SQL queries may be associated with a respective candidate query intent of the multiple candidate query intents. That is, the service 505 may generate multiple pairs of candidate SQL queries and candidate query intents for the database table.

The service 505 may generate the candidate SQL queries and the candidate query intents based on the database table. That is, the service 505 may not consider other database tables of the database when generating the candidate SQL queries and the candidate query intents. The generation may involve a language model crafting multiple queries based on the database metadata and the set of SQL query templates (e.g., predefined templates), which detail query formats (e.g., typical query formats) with placeholders for database elements, such as <column_name>, <table_name>, <condition>, <aggregate_function>. Example templates are as follows:

Distinct Conditional Selection: |
  SELECT DISTINCT <column_name> FROM <table_name> WHERE <condition> ORDER BY<column_name> LIMIT 500;

Aggregation: |
  SELECT <aggregate_function>(<column_name>) FROM <table_name> WHERE <condition> ORDER BY<column_name> LIMIT 500;

Group By: |
  SELECT <column_name>, <aggregate_function>(<another_column_name>) FROM <table_name> GROUP BY<column_name> ORDER BY<column_name> LIMIT 500;

Filtering with Multiple Conditions: |
  SELECT <column_name> FROM <table_name> WHERE <condition1> AND|OR <condition2> ORDER BY<column_name> LIMIT 500;

String Functions: |
  SELECT <column_name>, <string_function>(<column_name>) FROM <table_name> ORDER BY<column_name> LIMIT 500;

Case Statements: |
  SELECT <column_name>, CASE WHEN <condition> THEN <value1> ELSE <value2> END FROM <table_name> ORDER BY<column_name> LIMIT 500;

Filtering with LIKE:
  SELECT <column_name> FROM <table_name> WHERE <column_name> LIKE '%<pattern>%' ORDER BY<column_name> LIMIT 500;

Filtering with IN: |
  SELECT <column_name> FROM <table_name> WHERE <column_name> IN (<value1>, <value2>, . . . ) ORDER BY<column_name> LIMIT 500;

Filtering with BETWEEN: |
  SELECT <column_name> FROM <table_name> WHERE <column_name>BETWEEN <value1> AND <value2> ORDER BY<column_name> LIMIT 500;

Count Rows: |
  SELECT COUNT(<column_name>) FROM <table_name> WHERE <condition1> AND|OR <condition2> ORDER BY<column_name> LIMIT 500;

At 515, the service 505 may validate the candidate query intents. For example, the service 505 may validate a set of the candidate query intents of the respective multiple candidate query intents. In some examples, validating a candidate query intent of the respective multiple candidate query intents includes the operations at 520 and 525. For example, the service 505 may repeat the operations at 520 and 525, which may be described in the context of a single candidate query intent, to validate each of the multiple candidate query intents.

At 520, the service 505 may translate a candidate query intent into a test SQL query using the language model and the table metadata. For example, the service 505 may translate the candidate query intent into the test SQL query as described with reference to FIG. 3B. By reconstructing the SQL query that corresponds to a given query intent, the back-translation method may validate the integrity and relevance of the generated SQL queries. Additionally, or alternatively, the service 505 may translate the candidate SQL queries into natural language (e.g., test query intents) via a language model. In some examples, the translation may involve SQL templates, the database table, and table metadata. The translation (e.g., or back-translation) may be based on (e.g., assume) the database table, and the service may construct the candidate query intent and/or candidate SQL query (e.g., code) based on the database table.

After translating the candidate query intent into the test SQL query, at 525, the service 505 may determine whether the test SQL query corresponds to the candidate SQL query associated with the candidate query intent. For example, the service 505 may determine whether the test SQL query corresponds to the candidate SQL query based on the translation. In other words, the service 505 may compare the test SQL query generated based on the translation of the candidate query intent to the candidate SQL query initially corresponding to the candidate query intent. The service 505 may compare the test SQL query to the candidate SQL query to determine whether the pairing of the candidate SQL query and the candidate query intent is accurate.

At 530, the service 505 may augment the query intents. For example, the service 505 may augment each query intent of the set of query intents with one or more contextual cues resulting in one or more anchor query candidates for each query intent. The augmentation of query intents with contextual cues may be an example of the augmentation illustrated and described with reference to FIG. 3A. That is, the query intents and the contextual cues may be examples of a query intent 315 and a contextual cue 310, respectively, as described with reference to FIG. 3A. For example, each query intent of the set of query intents may specify a task to be executed via an SQL query in a natural language format, and each contextual cue of the one or more contextual cues for each query intent may specify a type of data to be retrieved via an SQL query in a natural language format.

In some examples, the service 505 may generate the contextual cues without identification of the database table. For example, the service 505 may remove an assumption that the "correct" table is known to the language model such that the service 505 may test whether the query intent and contextual cue return the correct table given metadata from other (e.g., "incorrect") tables. In other words, for each query intent of the set of query intents, the service 505 may generate the contextual cues via the language model based on a respective query intent of the set of query intents and the table metadata for the multiple database tables of the database.

Augmentation of the query intents may be a result of contrastive learning. For example, the language model may compare respective first vectors associated with each anchor query candidate to respective second vectors corresponding to table metadata for each database table of the multiple database tables. After comparing the vectors, the language model may select some anchor query candidates as negative training inputs into the language model based on the comparing resulting in identification of another database table different from the database table. In other words, the service 505 may provide feedback information to the language model, such as feedback indicating whether a correct table is selected, and the language model may adjust the contextual cue based on the feedback. The service 505 may augment contextual cues which result in correct table metadata selection by the language model and refrain from augmenting the contextual cues which result in incorrect table metadata selection. The contrastive learning may reduce erroneous table selection and/or enhance a reliability of the text-to-SQL translation.

At 535, the service 505 may generate anchor queries. For example, the service 505 may generate a set of anchor queries for the database table based on whether the one or more anchor query candidates for each query intent results in identification of the database table of multiple database tables by the language model. For example, the service may test whether the anchor queries accurately match with the corresponding database tables. After generating the anchor queries, the service 505 may map incoming requests to anchor queries (e.g., query-to-query semantic search) rather than table metadata (e.g., query-to-table semantic search), which may improve an accuracy associated with table selection, an efficiency associated with text-to-SQL translation, or both. The operations at 510 through 535 may be repeated for each database table (or a subset of database tables) in one or more databases such that a plurality of database tables are associated with respective sets of anchor queries.

In some examples, the service 505 may generate the anchor queries based on manual input. For example, a user of the service 505, such as a user of the computing device, may provide an input to the service 505 indicating an anchor query (e.g., a custom anchor query), an augmentation to a generated anchor query (e.g., a contextual cue added to an anchor query generated by the service 505), or both. In other words, a user of the service 505 may manually provide anchor queries or otherwise manually refine anchor queries generated by the service 505.

At 540, the computing device 140 may receive a user input. In response to receiving the user input at 540, at 545, the computing device 140 may indicate the user input to the service 505 (e.g., via an API request). For example, the service 505 may receive the user input, where the user input includes a natural language query. In response to receiving the user input, the service 505 may perform a semantic search based on the generated anchor queries and translate the user query into an SQL query. For example, the service 505 may perform text-to-SQL translation based on receiving the user input, which may be an example of the text-to-SQL translation as described with reference to FIGS. 2, 3A, and 4.

For example, at 550, the service 505 may generate a vector embedding. That is, the service 505 may generate the vector embedding based on the natural language query, where the vector embedding may correspond to or otherwise represent the natural language query. At 555, the service 505 may compare the vector embedding of the natural language query to vectors of the multiple anchor queries. For example, the service 505 may compare the vector embedding of the user input to respective anchor queries generated by the service 505 at 535. At 560, the service 505 may identify one or more database tables based on the comparing. For example, the service 505 may identify the one or more database tables based on vector embeddings of anchor queries associated with the one or more database tables having a threshold degree of similarity with the vector embedding of the user input.

At 565, the service 505 may generate an SQL query. For example, the service 505 may generate the SQL query based on the one or more database tables identified at 560. In some examples, the service 505 may generate the SQL query based on the metadata corresponding to the one or more database tables. After generating the SQL query, at 570, the service 505 may indicate a result to the computing device 140. For example, the service 505 may return the result of the generated SQL query from 565.

Figure 6:
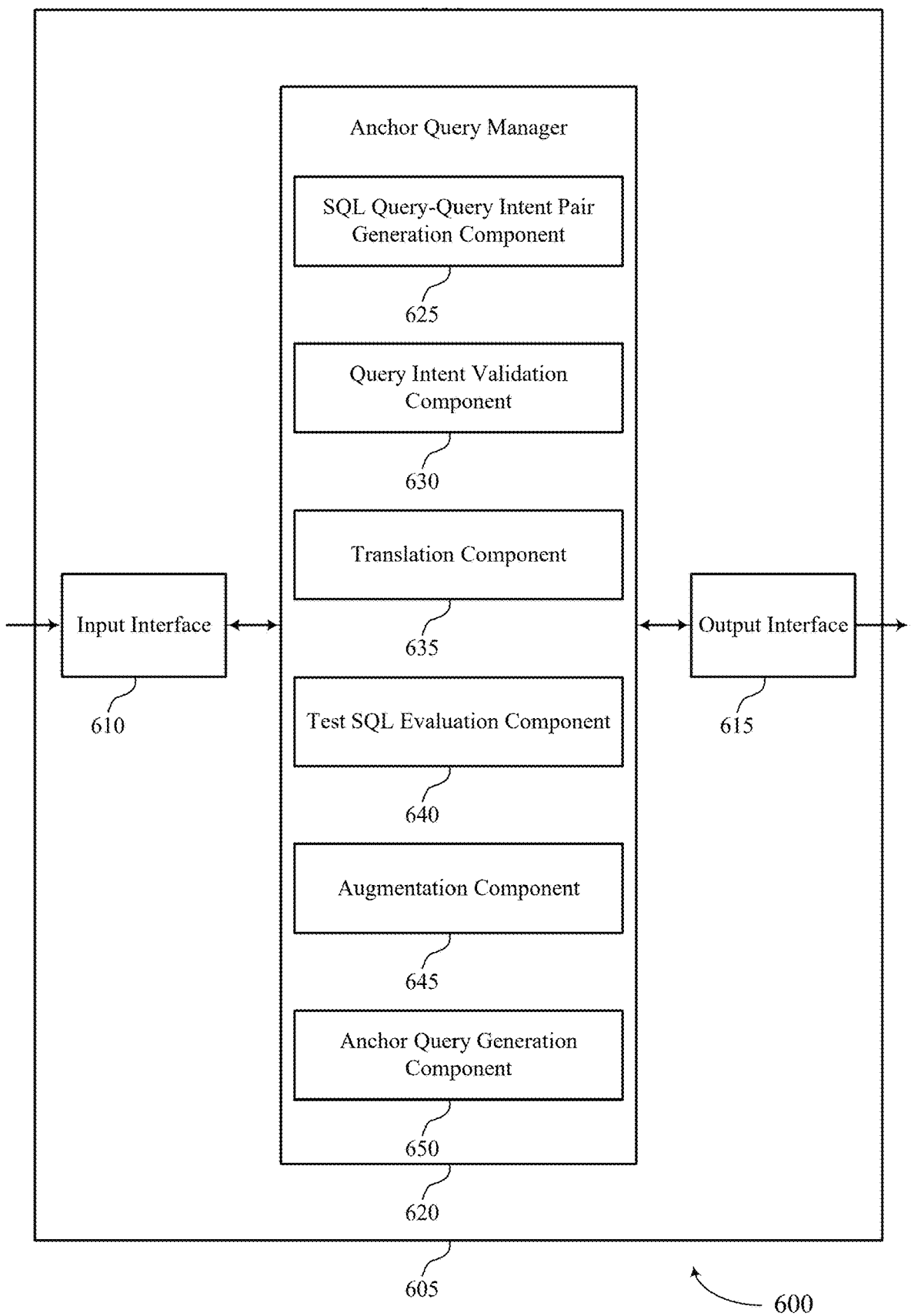
FIG. 6 shows a block diagram of an apparatus that supports text-to-SQL model anchor query generation in accordance with aspects of the present disclosure.

FIG. 6 shows a block diagram 600 of a system 605 that supports text-to-SQL model anchor query generation in accordance with aspects of the present disclosure. The system 605 may include an input interface 610, an output interface 615, and an anchor query manager 620. The system 605, or one or more components of the system 605 (e.g., the input interface 610, the output interface 615, the anchor query manager 620), may include at least one processor, which may be coupled with at least one memory, to support the described techniques. Each of these components may communicate, directly or indirectly, with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the anchor query manager 620 to support text-to-SQL model anchor query generation. In some cases, the input interface 610 may be a component of a network interface 825 as described with reference to FIG. 8.

The output interface 615 may manage output signaling for the system 605. For example, the output interface 615 may receive signaling from other components of the system 605, such as the anchor query manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the anchor query manager 620 may include an SQL query-query intent pair generation component 625, a query intent validation component 630, a translation component 635, a test SQL evaluation component 640, an augmentation component 645, an anchor query generation component 650, or any combination thereof. In some examples, the anchor query manager 620, or various components thereof, may be configured to perform various operations (e.g., receiving, monitoring, transmitting) using or otherwise in cooperation with the input interface 610, the output interface 615, or both. For example, the anchor query manager 620 may receive information from the input interface 610, send information to the output interface 615, or be integrated in combination with the input interface 610, the output interface 615, or both to receive information, transmit information, or perform various other operations as described herein.

The anchor query manager 620 may support anchor query generation in accordance with examples as disclosed herein. The SQL query-query intent pair generation component 625 may be configured as or otherwise support a means for generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents. The query intent validation component 630 may be configured as or otherwise support a means for validating a set of query intents of the respective plurality of candidate query intents, wherein validating a candidate query intent of the respective plurality of candidate query intents comprises. The translation component 635 may be configured as or otherwise support a means for translating, using the language model and the table metadata, the candidate query intent into a test SQL query. The test SQL evaluation component 640 may be configured as or otherwise support a means for determining whether the test SQL query corresponds to a candidate SQL query associated with the candidate query intent. The augmentation component 645 may be configured as or otherwise support a means for augmenting each query intent of the set of query intents with one or more contextual cues resulting in one or more anchor query candidates for each query intent. The anchor query generation component 650 may be configured as or otherwise support a means for generating a set of anchor queries for the database table based on whether the one or more anchor query candidates for each query intent results in identification of the database table of a plurality of database tables by the language model.

Figure 7:
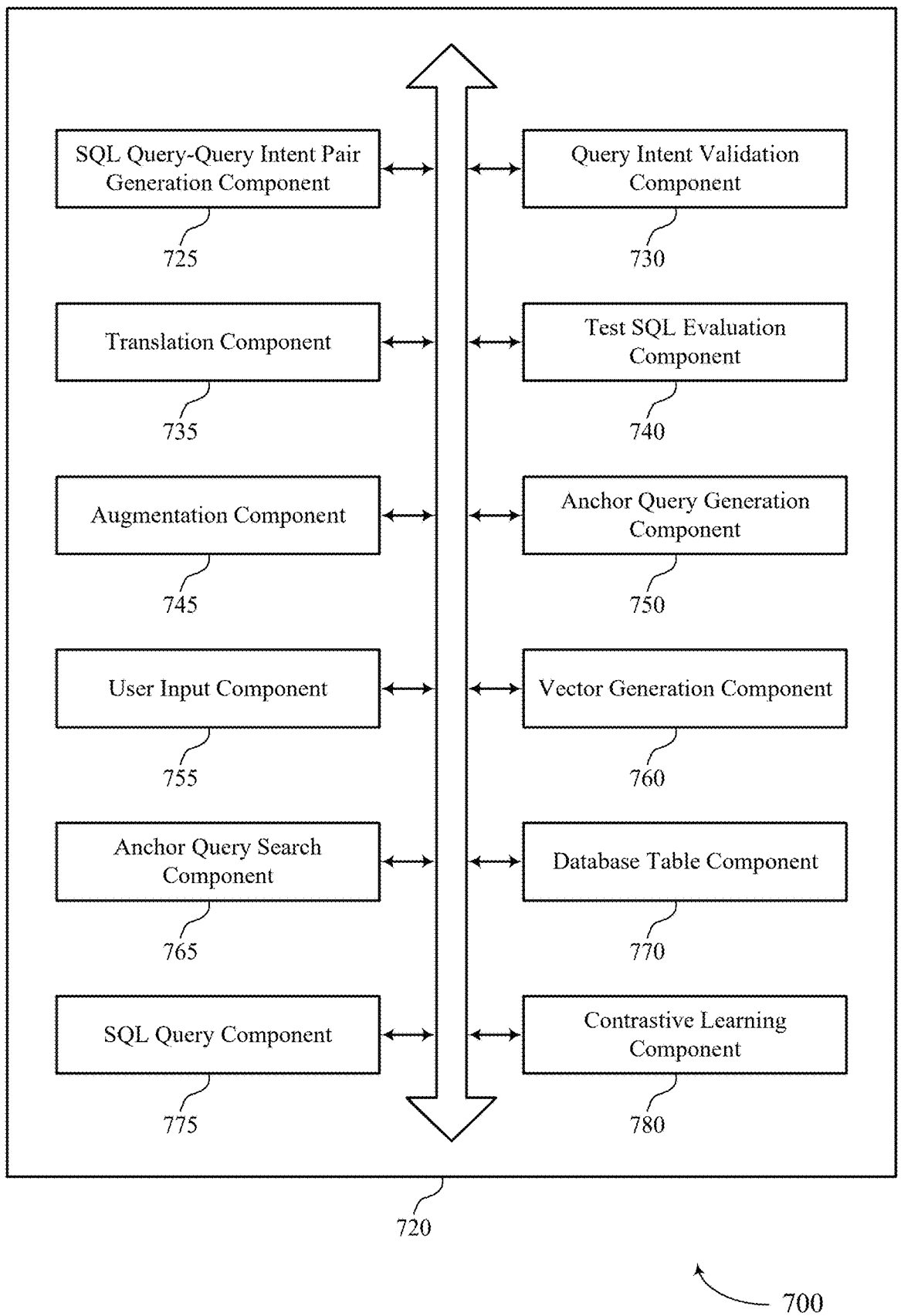
FIG. 7 shows a block diagram of an anchor query manager that supports text-to-SQL model anchor query generation in accordance with aspects of the present disclosure.

FIG. 7 shows a block diagram 700 of an anchor query manager 720 that supports text-to-SQL model anchor query generation in accordance with aspects of the present disclosure. The anchor query manager 720 may be an example of aspects of an anchor query manager or an anchor query manager 620, or both, as described herein. The anchor query manager 720, or various components thereof, may be an example of means for performing various aspects of text-to-SQL model anchor query generation as described herein. For example, the anchor query manager 720 may include an SQL query-query intent pair generation component 725, a query intent validation component 730, a translation component 735, a test SQL evaluation component 740, an augmentation component 745, an anchor query generation component 750, a user input component 755, a vector generation component 760, an anchor query search component 765, a database table component 770, an SQL query component 775, a contrastive learning component 780, or any combination thereof. Each of these components may communicate, directly or indirectly, with one another (e.g., via one or more buses, communications links, communications interfaces, or any combination thereof).

The anchor query manager 720 may support anchor query generation in accordance with examples as disclosed herein. The SQL query-query intent pair generation component 725 may be configured as or otherwise support a means for generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents. The query intent validation component 730 may be configured as or otherwise support a means for validating a set of query intents of the respective plurality of candidate query intents, wherein validating a candidate query intent of the respective plurality of candidate query intents comprises. The translation component 735 may be configured as or otherwise support a means for translating, using the language model and the table metadata, the candidate query intent into a test SQL query. The test SQL evaluation component 740 may be configured as or otherwise support a means for determining whether the test SQL query corresponds to a candidate SQL query associated with the candidate query intent. The augmentation component 745 may be configured as or otherwise support a means for augmenting each query intent of the set of query intents with one or more contextual cues resulting in one or more anchor query candidates for each query intent. The anchor query generation component 750 may be configured as or otherwise support a means for generating a set of anchor queries for the database table based on whether the one or more anchor query candidates for each query intent results in identification of the database table of a plurality of database tables by the language model.

In some examples, the user input component 755 may be configured as or otherwise support a means for receiving a user input comprising a natural language query. In some examples, the vector generation component 760 may be configured as or otherwise support a means for generating using the language model, a vector embedding based on the natural language query. In some examples, the anchor query search component 765 may be configured as or otherwise support a means for comparing, using the language model, the vector embedding of the natural language query to a plurality of vectors corresponding to a plurality of anchor queries including the set of anchor queries. In some examples, the database table component 770 may be configured as or otherwise support a means for identifying one or more database tables based on the comparing. In some examples, the SQL query component 775 may be configured as or otherwise support a means for generating a SQL query based on the identified one or more database tables. In some examples, the SQL query component 775 may be configured as or otherwise support a means for returning a result of the generated SQL query.

In some examples, the augmentation component 745 may be configured as or otherwise support a means for generating the one or more contextual cues for each query intent of the set of query intents via the language model based at least in part on a respective query intent of the set of query intents and the table metadata for the plurality of database tables.

In some examples, to support generating the set of anchor queries, the contrastive learning component 780 may be configured as or otherwise support a means for comparing respective first vectors associated with each anchor query candidate to respective second vectors corresponding to table metadata for each database table of the plurality of database tables.

In some examples, the contrastive learning component 780 may be configured as or otherwise support a means for selecting an anchor query candidate as an anchor query of the set of anchor queries based at least in part on the comparing resulting in identification of the database table.

In some examples, the contrastive learning component 780 may be configured as or otherwise support a means for using an anchor query candidate as a negative training input into the language model based at least in part on the comparing resulting in identification of another database table different from the database table.

In some examples, each SQL query template of the set of SQL query templates defines a query format comprising one or more placeholders for one or more database elements, the one or more database elements comprising one or more of a table name, a column name, a condition, and a function.

In some examples, each query intent of the set of query intents specifies a task to be executed via an SQL query in a natural language format.

In some examples, each contextual cue of the one or more contextual cues for each query intent specifies a type of data to be retrieved via an SQL query in a natural language format.

In some examples, the language model comprises a large language model (LLM).

Figure 8:
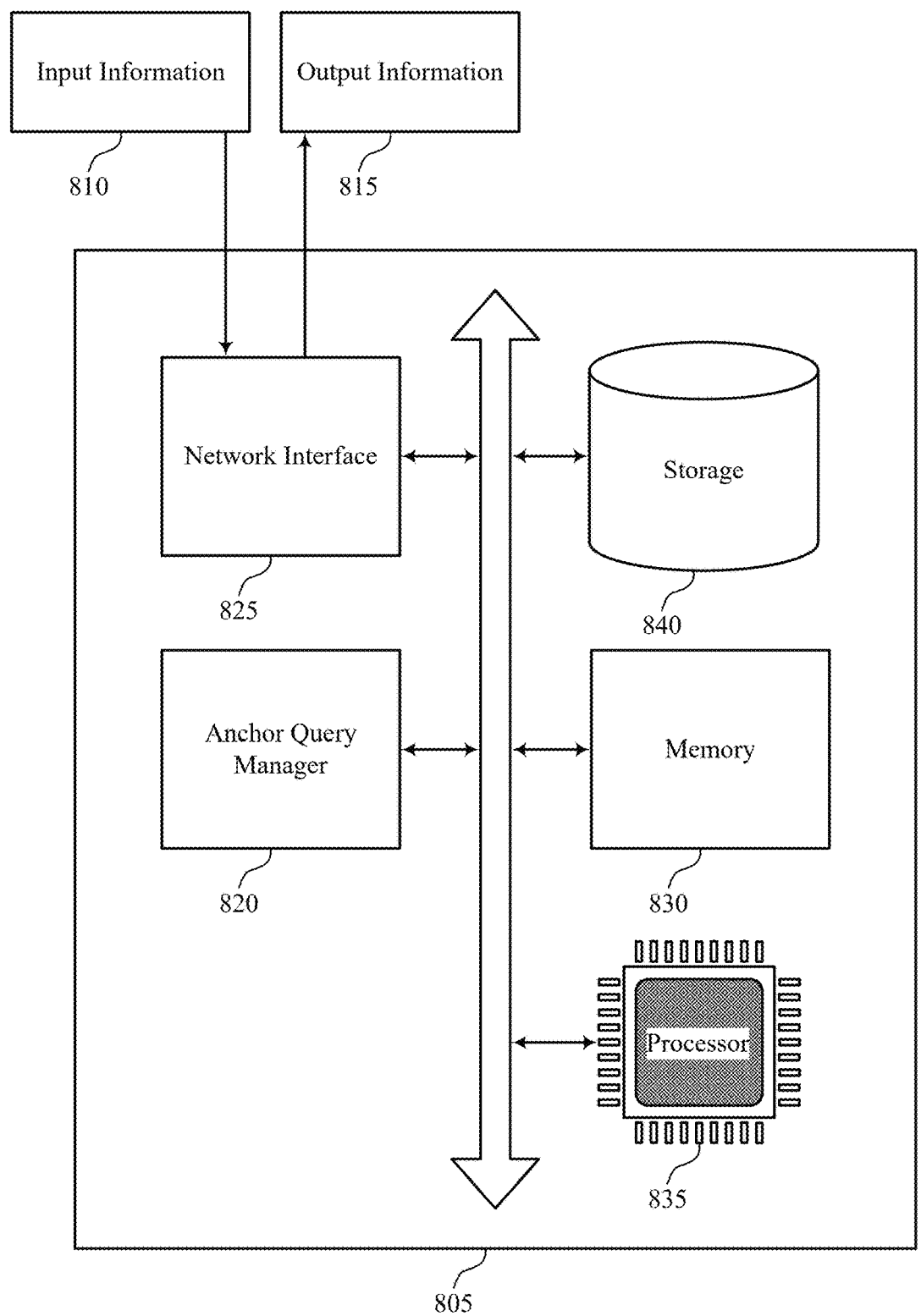
FIG. 8 shows a diagram of a system including a device that supports text-to-SQL model anchor query generation in accordance with aspects of the present disclosure.

FIG. 8 shows a diagram of a system 800 including a system 805 that supports text-to-SQL model anchor query generation in accordance with aspects of the present disclosure. The system 805 may be an example of or include components of a system 605 as described herein. The system 805 may include components for anchor query generation for text-to-SQL models including components for transmitting and receiving communications, model execution or access, and query generation, such as an anchor query manager 820, an input information 810, an output information 815, a network interface 825, at least one memory 830, at least one processor 835, and a storage 840. Each of these components may communicate, directly or indirectly, with one another (e.g., via one or more buses, communications links, communications interfaces, or any combination thereof).

The network interface 825 may enable the system 805 to exchange information (e.g., input information 810, output information 815, or both) with other systems or devices (not shown). For example, the network interface 825 may enable the system 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause at least one processor 835 to perform various functions described herein, such as functions supporting text-to-SQL model anchor query generation. In some cases, the memory 830 may contain, among other things, a basic input/output system (BIOS), which may control basic hardware or software operation such as the interaction with peripheral components or devices. In some cases, the memory 830 may be an example of aspects of one or more components of a custodial token platform 110 as described with reference to FIG. 1. The memory 830 may be an example of a single memory or multiple memories. For example, the system 805 may include one or more memories 830.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in at least one memory 830 to perform various functions (e.g., functions or tasks supporting text-to-SQL model anchor query generation). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. The processor 835 may be an example of a single processor or multiple processors. For example, the system 805 may include one or more processors 835.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1.

The anchor query manager 820 may support anchor query generation in accordance with examples as disclosed herein. For example, the anchor query manager 820 may be configured as or otherwise support a means for generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents. The anchor query manager 820 may be configured as or otherwise support a means for validating a set of query intents of the respective plurality of candidate query intents, wherein validating a candidate query intent of the respective plurality of candidate query intents comprises. The anchor query manager 820 may be configured as or otherwise support a means for translating, using the language model and the table metadata, the candidate query intent into a test SQL query. The anchor query manager 820 may be configured as or otherwise support a means for determining whether the test SQL query corresponds to a candidate SQL query associated with the candidate query intent. The anchor query manager 820 may be configured as or otherwise support a means for augmenting each query intent of the set of query intents with one or more contextual cues resulting in one or more anchor query candidates for each query intent. The anchor query manager 820 may be configured as or otherwise support a means for generating a set of anchor queries for the database table based on whether the one or more anchor query candidates for each query intent results in identification of the database table of a plurality of database tables by the language model.

By including or configuring the anchor query manager 820 in accordance with examples as described herein, the system 805 may support techniques for improved accuracy and efficiency associated with text-to-SQL translation.

Figure 9:
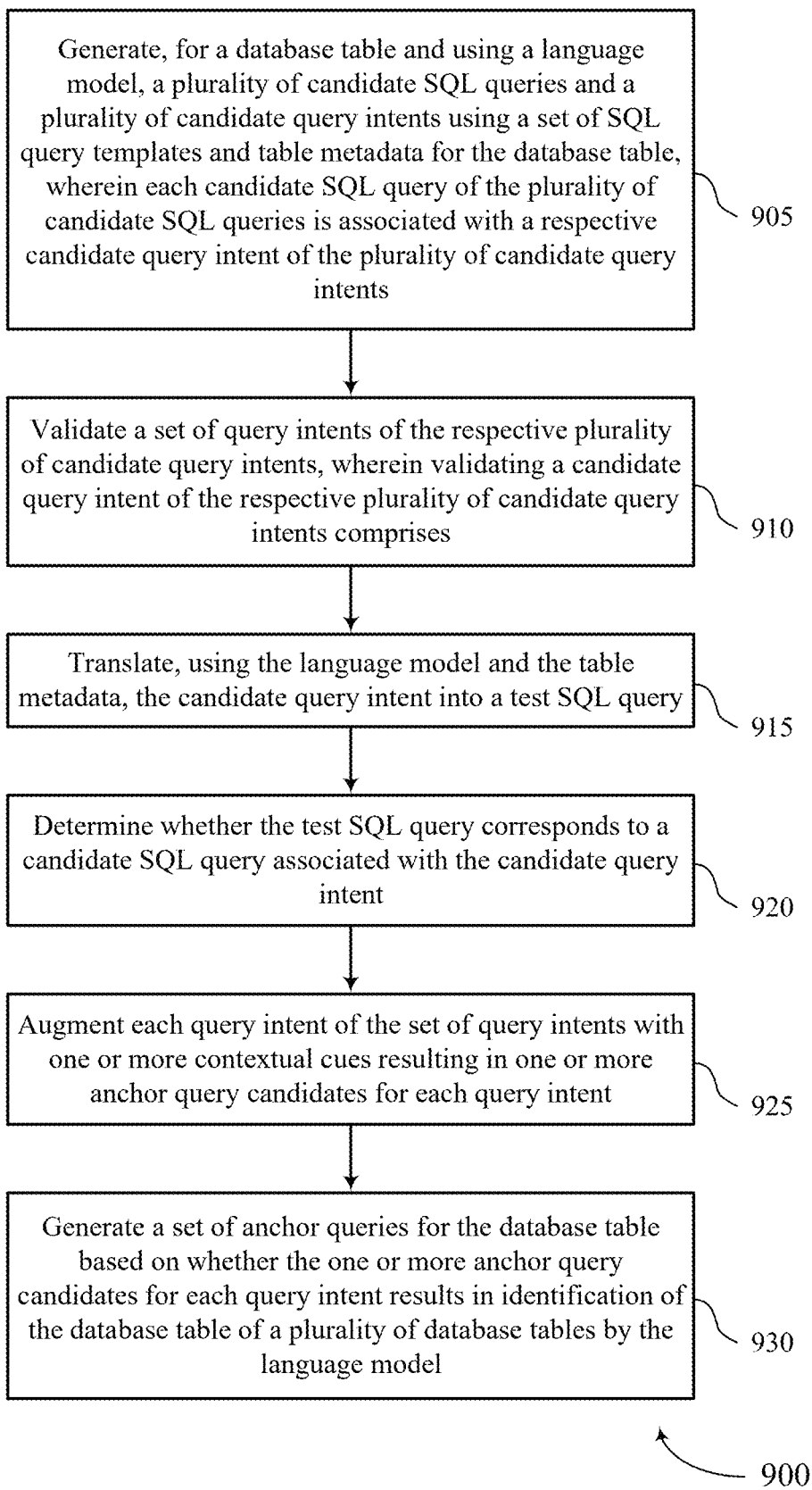
FIGS. 9 and 10 show flowcharts illustrating methods that support text-to-SQL model anchor query generation in accordance with aspects of the present disclosure.

FIG. 9 shows a flowchart illustrating a method 900 that supports text-to-SQL model anchor query generation in accordance with aspects of the present disclosure. The operations of the method 900 may be implemented by a custodial token platform or its components as described herein. For example, the operations of the method 900 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents. The operations of 905 may be performed in accordance with examples as disclosed herein. In some examples, aspects of the operations of 905 may be performed by an SQL query-query intent pair generation component 725 as described with reference to FIG. 7.

At 910, the method may include validating a set of query intents of the respective plurality of candidate query intents, wherein validating a candidate query intent of the respective plurality of candidate query intents comprises. The operations of 910 may be performed in accordance with examples as disclosed herein. In some examples, aspects of the operations of 910 may be performed by a query intent validation component 730 as described with reference to FIG. 7.

At 915, the method may include translating, using the language model and the table metadata, the candidate query intent into a test SQL query. The operations of 915 may be performed in accordance with examples as disclosed herein. In some examples, aspects of the operations of 915 may be performed by a translation component 735 as described with reference to FIG. 7.

At 920, the method may include determining whether the test SQL query corresponds to a candidate SQL query associated with the candidate query intent. The operations of 920 may be performed in accordance with examples as disclosed herein. In some examples, aspects of the operations of 920 may be performed by a test SQL evaluation component 740 as described with reference to FIG. 7.

At 925, the method may include augmenting each query intent of the set of query intents with one or more contextual cues resulting in one or more anchor query candidates for each query intent. The operations of 925 may be performed in accordance with examples as disclosed herein. In some examples, aspects of the operations of 925 may be performed by an augmentation component 745 as described with reference to FIG. 7.

At 930, the method may include generating a set of anchor queries for the database table based on whether the one or more anchor query candidates for each query intent results in identification of the database table of a plurality of database tables by the language model. The operations of 930 may be performed in accordance with examples as disclosed herein. In some examples, aspects of the operations of 930 may be performed by an anchor query generation component 750 as described with reference to FIG. 7.

Figure 10:
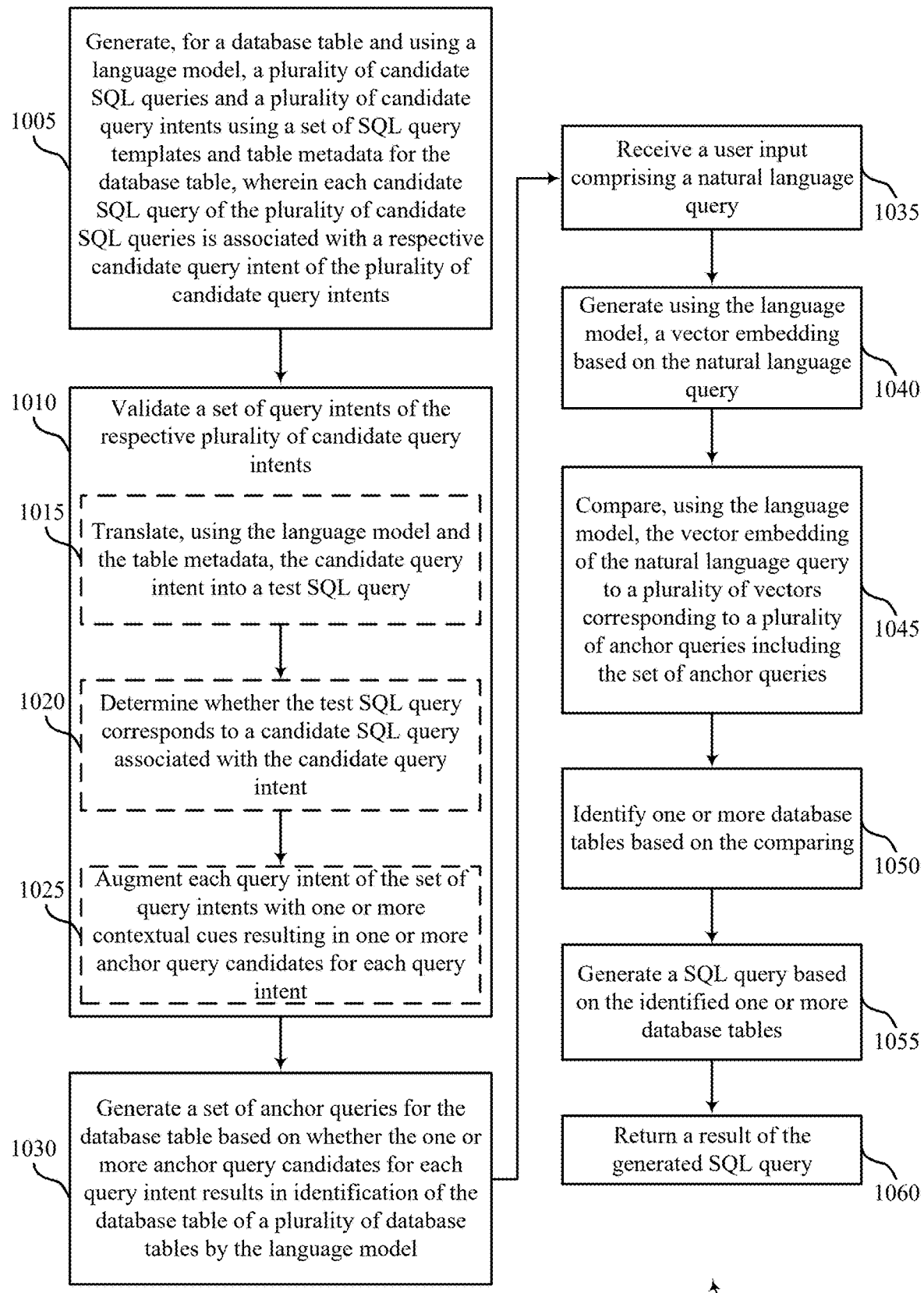

FIG. 10 shows a flowchart illustrating a method 1000 that supports text-to-SQL model anchor query generation in accordance with aspects of the present disclosure. The operations of the method 1000 may be implemented by a custodial token platform or its components as described herein. For example, the operations of the method 1000 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents. The operations of 1005 may be performed in accordance with examples as disclosed herein.

In some examples, aspects of the operations of 1005 may be performed by an SQL query-query intent pair generation component 725 as described with reference to FIG. 7.

At 1010, the method may include validating a set of query intents of the respective plurality of candidate query intents, wherein validating a candidate query intent of the respective plurality of candidate query intents comprises. The operations of 1010 may be performed in accordance with examples as disclosed herein. In some examples, aspects of the operations of 1010 may be performed by a query intent validation component 730 as described with reference to FIG. 7.

At 1015, the method may include translating, using the language model and the table metadata, the candidate query intent into a test SQL query. The operations of 1015 may be performed in accordance with examples as disclosed herein. In some examples, aspects of the operations of 1015 may be performed by a translation component 735 as described with reference to FIG. 7.

At 1020, the method may include determining whether the test SQL query corresponds to a candidate SQL query associated with the candidate query intent. The operations of 1020 may be performed in accordance with examples as disclosed herein. In some examples, aspects of the operations of 1020 may be performed by a test SQL evaluation component 740 as described with reference to FIG. 7.

At 1025, the method may include augmenting each query intent of the set of query intents with one or more contextual cues resulting in one or more anchor query candidates for each query intent. The operations of 1025 may be performed in accordance with examples as disclosed herein. In some examples, aspects of the operations of 1025 may be performed by an augmentation component 745 as described with reference to FIG. 7.

At 1030, the method may include generating a set of anchor queries for the database table based on whether the one or more anchor query candidates for each query intent results in identification of the database table of a plurality of database tables by the language model. The operations of 1030 may be performed in accordance with examples as disclosed herein. In some examples, aspects of the operations of 1030 may be performed by an anchor query generation component 750 as described with reference to FIG. 7.

At 1035, the method may include receiving a user input comprising a natural language query. The operations of 1035 may be performed in accordance with examples as disclosed herein. In some examples, aspects of the operations of 1035 may be performed by a user input component 755 as described with reference to FIG. 7.

At 1040, the method may include generating using the language model, a vector embedding based on the natural language query. The operations of 1040 may be performed in accordance with examples as disclosed herein. In some examples, aspects of the operations of 1040 may be performed by a vector generation component 760 as described with reference to FIG. 7.

At 1045, the method may include comparing, using the language model, the vector embedding of the natural language query to a plurality of vectors corresponding to a plurality of anchor queries including the set of anchor queries. The operations of 1045 may be performed in accordance with examples as disclosed herein. In some examples, aspects of the operations of 1045 may be performed by an anchor query search component 765 as described with reference to FIG. 7.

At 1050, the method may include identifying one or more database tables based on the comparing. The operations of 1050 may be performed in accordance with examples as disclosed herein. In some examples, aspects of the operations of 1050 may be performed by a database table component 770 as described with reference to FIG. 7.

At 1055, the method may include generating a SQL query based on the identified one or more database tables. The operations of 1055 may be performed in accordance with examples as disclosed herein. In some examples, aspects of the operations of 1055 may be performed by an SQL query component 775 as described with reference to FIG. 7.

At 1060, the method may include returning a result of the generated SQL query. The operations of 1060 may be performed in accordance with examples as disclosed herein. In some examples, aspects of the operations of 1060 may be performed by an SQL query component 775 as described with reference to FIG. 7.

A method for anchor query generation by an apparatus is described. The method may include generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents, validating a set of query intents of the respective plurality of candidate query intents, wherein validating a candidate query intent of the respective plurality of candidate query intents comprises, translating, using the language model and the table metadata, the candidate query intent into a test SQL query, determining whether the test SQL query corresponds to a candidate SQL query associated with the candidate query intent, augmenting each query intent of the set of query intents with one or more contextual cues resulting in one or more anchor query candidates for each query intent, and generating a set of anchor queries for the database table based on whether the one or more anchor query candidates for each query intent results in identification of the database table of a plurality of database tables by the language model.

An apparatus for anchor query generation is described. The apparatus may include one or more memories storing processor executable code, and one or more processors coupled with the one or more memories. The one or more processors may individually or collectively be operable to execute the code to cause the apparatus to generate, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents, validate a set of query intents of the respective plurality of candidate query intents, wherein validating a candidate query intent of the respective plurality of candidate query intents comprises, translate, using the language model and the table metadata, the candidate query intent into a test SQL query, determine whether the test SQL query corresponds to a candidate SQL query associated with the candidate query intent, augment each query intent of the set of query intents with one or more contextual cues resulting in one or more anchor query candidates for each query intent, and generate a set of anchor queries for the database table based on whether the one or more anchor query candidates for each query intent results in identification of the database table of a plurality of database tables by the language model.

Another apparatus for anchor query generation is described. The apparatus may include means for generating, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents, means for validating a set of query intents of the respective plurality of candidate query intents, wherein validating a candidate query intent of the respective plurality of candidate query intents comprises, means for translating, using the language model and the table metadata, the candidate query intent into a test SQL query, means for determining whether the test SQL query corresponds to a candidate SQL query associated with the candidate query intent, means for augmenting each query intent of the set of query intents with one or more contextual cues resulting in one or more anchor query candidates for each query intent, and means for generating a set of anchor queries for the database table based on whether the one or more anchor query candidates for each query intent results in identification of the database table of a plurality of database tables by the language model.

A non-transitory computer-readable medium storing code for anchor query generation is described. The code may include instructions executable by one or more processors to generate, for a database table and using a language model, a plurality of candidate SQL queries and a plurality of candidate query intents using a set of SQL query templates and table metadata for the database table, wherein each candidate SQL query of the plurality of candidate SQL queries is associated with a respective candidate query intent of the plurality of candidate query intents, validate a set of query intents of the respective plurality of candidate query intents, wherein validating a candidate query intent of the respective plurality of candidate query intents comprises, translate, using the language model and the table metadata, the candidate query intent into a test SQL query, determine whether the test SQL query corresponds to a candidate SQL query associated with the candidate query intent, augment each query intent of the set of query intents with one or more contextual cues resulting in one or more anchor query candidates for each query intent, and generate a set of anchor queries for the database table based on whether the one or more anchor query candidates for each query intent results in identification of the database table of a plurality of database tables by the language model.

Some examples of the method, apparatus, and non-transitory computer-readable medium described herein may further include operations, features, means, or instructions for receiving a user input comprising a natural language query, generating using the language model, a vector embedding based on the natural language query, comparing, using the language model, the vector embedding of the natural language query to a plurality of vectors corresponding to a plurality of anchor queries including the set of anchor queries, identifying one or more database tables based on the comparing, generating a SQL query based on the identified one or more database tables, and returning a result of the generated SQL query.

Some examples of the method, apparatus, and non-transitory computer-readable medium described herein may further include operations, features, means, or instructions for generating the one or more contextual cues for each query intent of the set of query intents via the language model based at least in part on a respective query intent of the set of query intents and the table metadata for the plurality of database tables.

In some examples of the method, apparatus, and non-transitory computer-readable medium described herein, generating the set of anchor queries may include operations, features, means, or instructions for comparing respective first vectors associated with each anchor query candidate to respective second vectors corresponding to table metadata for each database table of the plurality of database tables.

Some examples of the method, apparatus, and non-transitory computer-readable medium described herein may further include operations, features, means, or instructions for selecting an anchor query candidate as an anchor query of the set of anchor queries based at least in part on the comparing resulting in identification of the database table.

Some examples of the method, apparatus, and non-transitory computer-readable medium described herein may further include operations, features, means, or instructions for using an anchor query candidate as a negative training input into the language model based at least in part on the comparing resulting in identification of another database table different from the database table.

In some examples of the method, apparatus, and non-transitory computer-readable medium described herein, each SQL query template of the set of SQL query templates defines a query format comprising one or more placeholders for one or more database elements, the one or more database elements comprising one or more of a table name, a column name, a condition, and a function.

In some examples of the method, apparatus, and non-transitory computer-readable medium described herein, each query intent of the set of query intents specifies a task to be executed via an SQL query in a natural language format.

In some examples of the method, apparatus, and non-transitory computer-readable medium described herein, each contextual cue of the one or more contextual cues for each query intent specifies a type of data to be retrieved via an SQL query in a natural language format.

In some examples of the method, apparatus, and non-transitory computer-readable medium described herein, the language model comprises a large language model (LLM).

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for anchor query generation, comprising:
generating, for a database table and using a language model, a plurality of candidate structured query language (SQL) queries and a plurality of candidate query intents using a set of SQL query templates and table metadata for the database table, wherein each candidate SQL query of the plurality of candidate SQL queries is associated with a respective candidate query intent of the plurality of candidate query intents;
validating a set of query intents of the respective plurality of candidate query intents, wherein validating a candidate query intent of the respective plurality of candidate query intents comprises:
translating, using the language model and the table metadata, the candidate query intent into a test SQL query, and
determining whether the test SQL query corresponds to a candidate SQL query associated with the candidate query intent;
augmenting each query intent of the set of query intents with one or more contextual cues resulting in one or more anchor query candidates for each query intent, wherein the one or more anchor query candidates are representative of one or more natural language queries;

generating a set of anchor queries for the database table based on whether the one or more anchor query candidates for each query intent results in identification of the database table of a plurality of database tables by the language model;

receiving a user input comprising a natural language query; and generating an SQL query corresponding to the natural language query based at least in part on comparing, using the language model, a vector embedding of the natural language query to a plurality of vectors corresponding to a plurality of anchor queries including the set of anchor queries.

2. The method of claim 1, further comprising:
generating using the language model, the vector embedding based on the natural language query;
comparing, using the language model, the vector embedding of the natural language query to the plurality of vectors corresponding to the plurality of anchor queries including the set of anchor queries;
identifying one or more database tables based on the comparing, wherein generating the SQL query is based on the identified one or more database tables; and
returning a result of the generated SQL query.

3. The method of claim 1, further comprising:
generating the one or more contextual cues for each query intent of the set of query intents via the language model based at least in part on a respective query intent of the set of query intents and the table metadata for the plurality of database tables.

4. The method of claim 1, wherein generating the set of anchor queries further comprises:
comparing respective first vectors associated with each anchor query candidate to respective second vectors corresponding to table metadata for each database table of the plurality of database tables.

5. The method of claim 4, further comprising:
selecting an anchor query candidate as an anchor query of the set of anchor queries based at least in part on the comparing resulting in identification of the database table.

6. The method of claim 4, further comprising:
using an anchor query candidate as a negative training input into the language model based at least in part on the comparing resulting in identification of another database table different from the database table.

7. The method of claim 1, wherein each SQL query template of the set of SQL query templates defines a query format comprising one or more placeholders for one or more database elements, the one or more database elements comprising one or more of a table name, a column name, a condition, and a function.

8. The method of claim 1, wherein each query intent of the set of query intents specifies a task to be executed via an SQL query in a natural language format.

9. The method of claim 1, wherein each contextual cue of the one or more contextual cues for each query intent specifies a type of data to be retrieved via an SQL query in a natural language format.

10. The method of claim 1, wherein the language model comprises a large language model (LLM).

11. An apparatus for anchor query generation, comprising:
one or more memories storing processor-executable code; and
one or more processors coupled with the one or more memories and individually or collectively operable to execute the code to cause the apparatus to:
generate, for a database table and using a language model, a plurality of candidate structured query language (SQL) queries and a plurality of candidate query intents using a set of SQL query templates and table metadata for the database table, wherein each candidate SQL query of the plurality of candidate SQL queries is associated with a respective candidate query intent of the plurality of candidate query intents;
validate a set of query intents of the respective plurality of candidate query intents, wherein validating a candidate query intent of the respective plurality of candidate query intents comprises:
translating, using the language model and the table metadata, the candidate query intent into a test SQL query, and
determining whether the test SQL query corresponds to a candidate SQL query associated with the candidate query intent;
augment each query intent of the set of query intents with one or more contextual cues resulting in one or more anchor query candidates for each query intent, wherein the one or more anchor query candidates are representative of one or more natural language queries;
generate a set of anchor queries for the database table based on whether the one or more anchor query candidates for each query intent results in identification of the database table of a plurality of database tables by the language model;
receive a user input comprising a natural language query; and
generate an SQL query corresponding to the natural language query based at least in part on comparing, using the language model, a vector embedding of the natural language query to a plurality of vectors corresponding to a plurality of anchor queries including the set of anchor queries.

12. The apparatus of claim 11, wherein the one or more processors are individually or collectively further operable to execute the code to cause the apparatus to:
generate using the language model, the vector embedding based on the natural language query;
compare, using the language model, the vector embedding of the natural language query to the plurality of vectors corresponding to the plurality of anchor queries including the set of anchor queries;
identify one or more database tables based on the comparing, wherein generating the SQL query is based on the identified one or more database tables; and
return a result of the generated SQL query.

13. The apparatus of claim 11, wherein the one or more processors are individually or collectively further operable to execute the code to cause the apparatus to:
generate the one or more contextual cues for each query intent of the set of query intents via the language model based at least in part on a respective query intent of the set of query intents and the table metadata for the plurality of database tables.

14. The apparatus of claim 11, wherein, to generate the set of anchor queries, the one or more processors are individually or collectively further operable to execute the code to cause the apparatus to:

compare respective first vectors associated with each anchor query candidate to respective second vectors corresponding to table metadata for each database table of the plurality of database tables.

15. The apparatus of claim 14, wherein the one or more processors are individually or collectively further operable to execute the code to cause the apparatus to:

select an anchor query candidate as an anchor query of the set of anchor queries based at least in part on the comparing resulting in identification of the database table.

16. The apparatus of claim 14, wherein the one or more processors are individually or collectively further operable to execute the code to cause the apparatus to:

use an anchor query candidate as a negative training input into the language model based at least in part on the comparing resulting in identification of another database table different from the database table.

17. The apparatus of claim 11, wherein each SQL query template of the set of SQL query templates defines a query format comprising one or more placeholders for one or more database elements, the one or more database elements comprising one or more of a table name, a column name, a condition, and a function.

18. The apparatus of claim 11, wherein each query intent of the set of query intents specifies a task to be executed via an SQL query in a natural language format.

19. A non-transitory computer-readable medium storing code for anchor query generation, the code comprising instructions executable by one or more processors to:

generate, for a database table and using a language model, a plurality of candidate structured query language (SQL) queries and a plurality of candidate query intents using a set of SQL query templates and table metadata for the database table, wherein each candidate SQL query of the plurality of candidate SQL queries is associated with a respective candidate query intent of the plurality of candidate query intents;

validate a set of query intents of the respective plurality of candidate query intents, wherein validating a candidate query intent of the respective plurality of candidate query intents comprises:

translating, using the language model and the table metadata, the candidate query intent into a test SQL query, and determining whether the test SQL query corresponds to a candidate SQL query associated with the candidate query intent;

augment each query intent of the set of query intents with one or more contextual cues resulting in one or more anchor query candidates for each query intent, wherein the one or more anchor query candidates are representative of one or more natural language queries;

generate a set of anchor queries for the database table based on whether the one or more anchor query candidates for each query intent results in identification of the database table of a plurality of database tables by the language model;

receive a user input comprising a natural language query; and generate an SQL query corresponding to the natural language query based at least in part on comparing, using the language model, a vector embedding of the natural language query to a plurality of vectors corresponding to a plurality of anchor queries including the set of anchor queries.

20. The non-transitory computer-readable medium of claim 19, wherein the instructions are further executable by the one or more processors to:

generate using the language model, the vector embedding based on the natural language query;

compare, using the language model, the vector embedding of the natural language query to the plurality of vectors corresponding to the plurality of anchor queries including the set of anchor queries;

identify one or more database tables based on the comparing, wherein generating the SQL query is based on the identified one or more database tables; and return a result of the generated SQL query.

* * * * *